United States Patent
Frantz et al.

(10) Patent No.: US 6,844,497 B2
(45) Date of Patent: Jan. 18, 2005

(54) WIRE HARNESS ARRANGEMENT

(75) Inventors: Matthew Frantz, Marysville, OH (US); John Hill, Dublin, OH (US)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/106,555

(22) Filed: Mar. 26, 2002

(65) Prior Publication Data

US 2003/0183411 A1 Oct. 2, 2003

(51) Int. Cl.[7] .................................................. H02G 1/00
(52) U.S. Cl. .................... 174/72 A; 174/72 R; 174/69; 174/95; 174/135; 248/49; 248/68.1; 296/146.7; 49/502
(58) Field of Search ............................ 174/72 A, 72 R, 174/69, 95, 135; 248/49, 68.1; 296/146.7; 49/502

(56) References Cited

U.S. PATENT DOCUMENTS

| | | | | |
|---|---|---|---|---|
| 4,653,799 A | * | 3/1987 | Arai et al. ............. | 296/146.12 |
| 4,716,623 A | * | 1/1988 | Kinaga et al. ................ | 16/371 |
| 5,016,842 A | | 5/1991 | Suzuki et al. .............. | 248/68.1 |
| 5,164,546 A | | 11/1992 | Kumagai ..................... | 174/135 |
| 5,499,823 A | * | 3/1996 | Fukui .......................... | 277/314 |
| 5,588,260 A | | 12/1996 | Suzuki et al. ................ | 49/502 |
| 5,716,044 A | * | 2/1998 | Peterson et al. ............ | 296/152 |
| 5,879,047 A | * | 3/1999 | Yamaguchi et al. ..... | 296/146.7 |
| 5,884,961 A | | 3/1999 | Serizawa et al. ......... | 296/146.7 |
| 5,904,584 A | * | 5/1999 | Flask et al. ................. | 439/157 |
| 5,962,814 A | | 10/1999 | Skipworth et al. .......... | 174/135 |
| 6,056,598 A | * | 5/2000 | Ramsey ...................... | 439/596 |
| 6,135,538 A | * | 10/2000 | Serizawa et al. ......... | 296/146.7 |
| 6,217,375 B1 | | 4/2001 | Nagai et al. ................ | 439/501 |
| 6,312,046 B1 | * | 11/2001 | Sora et al. ................... | 296/208 |
| 6,350,956 B1 | * | 2/2002 | Sakata ........................ | 174/101 |
| 6,479,748 B2 | * | 11/2002 | Mori ........................ | 174/65 G |

* cited by examiner

Primary Examiner—Dean A. Reichard
Assistant Examiner—Jinhee Lee
(74) Attorney, Agent, or Firm—Fay, Sharpe, Fagan, Minnich & McKee LLP (57) ABSTRACT

A vehicle door wire harness arrangement extending between a vehicle main body and a vehicle door along a door hinge is provided. The vehicle door wire harness arrangement includes a hinge connecting a vehicle main body and a vehicle door. The vehicle door wire harness arrangement further includes a protector conforming to the shape of the hinge for carrying at least one wire along the hinge. The at least one wire extends between the vehicle main body and the vehicle door.

24 Claims, 6 Drawing Sheets

WIRE HARNESS ARRANGEMENT

BACKGROUND OF THE INVENTION

1. Field of the Invention

The present invention relates to a wire connection between a vehicle main body and a movable vehicle component connected thereto. The present invention finds particular application as a wire harness arrangement for carrying one or more wires between a vehicle main body and a vehicle door and will be described with particular reference thereto. More specifically, the wire harness arrangement includes a segmented protector that conforms to the shape of a hinge member. The hinge member connects the vehicle door to the vehicle main body. In addition, a first grommet may be used in conjunction with the protector to carry the one or more wires from the protector to the vehicle door and a second grommet may be used in conjunction with the protector to carry the one or more wires from the protector to the vehicle main body. It will be appreciated, however, that the invention may relate to other similar environments and applications.

2. Description of the Prior Art

Vehicle manufacturers often require one or more wires (a wire grouping) to connect between a vehicle main body and a connected vehicle component such as a door, trunk, panel member or the like. The vehicle main body often includes a power source, electrical controls and electrical components. The connected vehicle component may include electrical components and controls such as electric windows and controls thereof; electric mirrors, mirror defrosters and controls thereof; exterior and interior lights; control illuminations; audio speakers; and various other types of components and controls. The one or more wires connecting between the vehicle main body and the connected vehicle component allow the electrical controls and devices of the connected vehicle component to be powered and communicate with the electrical controls and devices of the vehicle main body.

Because the connected vehicle component may be on the vehicle exterior, it is often desirable to insulate the one or more wires connecting between the vehicle component and the vehicle main body. For example, when the vehicle component is a passenger compartment door, wires connected thereto from the vehicle main body need insulation to avoid being exposed to environmental conditions, such as water, whether from rain, a car wash, or road spray, when the passenger door is ajar or fully opened. While neither the use of a grommet alone nor the use of this invention completely insulates the wires from water, it minimizes the intrusion of water into the vehicle and provides some protection to the otherwise exposed wires. Additionally, it is often desirable to protect the one or more wires from damage and excessive wear by providing a supported casing around the one or more wires. Damage and excessive wear may be caused, for example, by the one or more wires rubbing against a portion of the connected vehicle component or the vehicle main body, particularly, during movement of the connected vehicle component.

When the connected vehicle component is a passenger compartment door, a typical wiring application includes several wires connecting between the door and the vehicle main body. The several wires are often carried as a bunch forming a wire grouping. In prior art applications, the wire grouping is commonly carried in a single conventional grommet. The conventional grommet is a flexible tube capable of bending when the vehicle door is closed and extending when the vehicle door is opened. U.S. Pat. No. 5,588,260 to Suzuki et al., expressly incorporated herein by reference, discloses a waterproof grommet adapted to carry one or more wires therein between a vehicle main body and a vehicle door. The conventional grommet insulates the one or more wires from environmental conditions, such as rain, and provides some protection to the one or more wires from damage and excessive wear.

While a single grommet extending between the vehicle door and the vehicle main body may be sufficient in certain conventional car door applications, it has several drawbacks in other vehicle applications. For example, in conventional vehicle door applications, the angle between the vehicle door in a fully opened position and the vehicle main body is typically limited to some acute angle such as about seventy degrees. However, in other alternative vehicle door applications, the angle between the vehicle main body and the fully opened vehicle door may be in excess of seventy degrees. For example, the angle may be an angle approaching ninety degrees, an obtuse angle, or even an angle greater than one hundred and eighty degrees. The single grommet connection of the prior art is generally unsuitable for these types of alternative vehicle door applications. This unsuitability is magnified in instances where a C-shaped hinge is used to join the door to the vehicle body.

More specifically, while the single grommet is suitable for limited bending over relatively short lengths, a single grommet is insufficient for a large bend such as one hundred and eighty degrees. The single grommet arrangement provides inadequate support to the one or more wires carried therein along its length when adapted for such large bends. This lack of support may lead to damage or excessive wear to the one or more wires carried within the single grommet. Further, the unsupported grommet may undesirably protrude into the vehicle compartment when the vehicle door is shut. Thus, it is desirable to provide a vehicle wire harness arrangement capable of providing an insulated and protected connection for unobtrusively carrying one or more wires between a vehicle body and a moveable vehicle component, such as a door, that is capable of being opened beyond an angle of about seventy degrees.

The present invention provides a new and improved vehicle wire harness arrangement that overcomes the foregoing difficulties and others and provides the aforementioned advantageous features.

SUMMARY OF THE INVENTION

In accordance with one aspect of the present invention, a new and improved vehicle door wire harness arrangement is provided for extending between a vehicle main body and a vehicle door along a door hinge.

More particularly, in accordance with this aspect of the invention, the vehicle door wire harness arrangement comprises a hinge connecting a vehicle main body and a vehicle door. The vehicle door wire harness arrangement further comprises a protector conforming to the shape of the hinge for carrying at least one wire along the hinge. The at least one wire connects between the vehicle main body and the vehicle door.

According to another aspect of the present invention, a new and improved wire harness is provided for carrying at least one wire therein between first and second vehicle components wherein the first vehicle component is adapted to move relative to the second vehicle component.

More particularly, in accordance with this aspect of the invention, the wire harness comprises a flexible grommet having a first end connected to one of the first and second vehicle components and a second end. The grommet is adapted to carry the at least one wire therein from the first end to the second end. The wire harness further comprises a protector having a first end connected to the second end of the grommet. The wire protector is adapted to carry the at least one wire therein from the second end of the grommet to the second end of the protector. The at least one wire extends from the protector second end to the other one of the first and second vehicle components.

According to still another aspect of the present invention, a new and improved protector is provided.

More particularly, in accordance with this aspect of the invention, the protector comprises a first segment including a first wire receiving area and a second segment including a second wire receiving area. The second segment is attached to the first segment by a flexible connector.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DETAILED DESCRIPTION OF THE PREFERRED EMBODIMENTS

Figure 1:
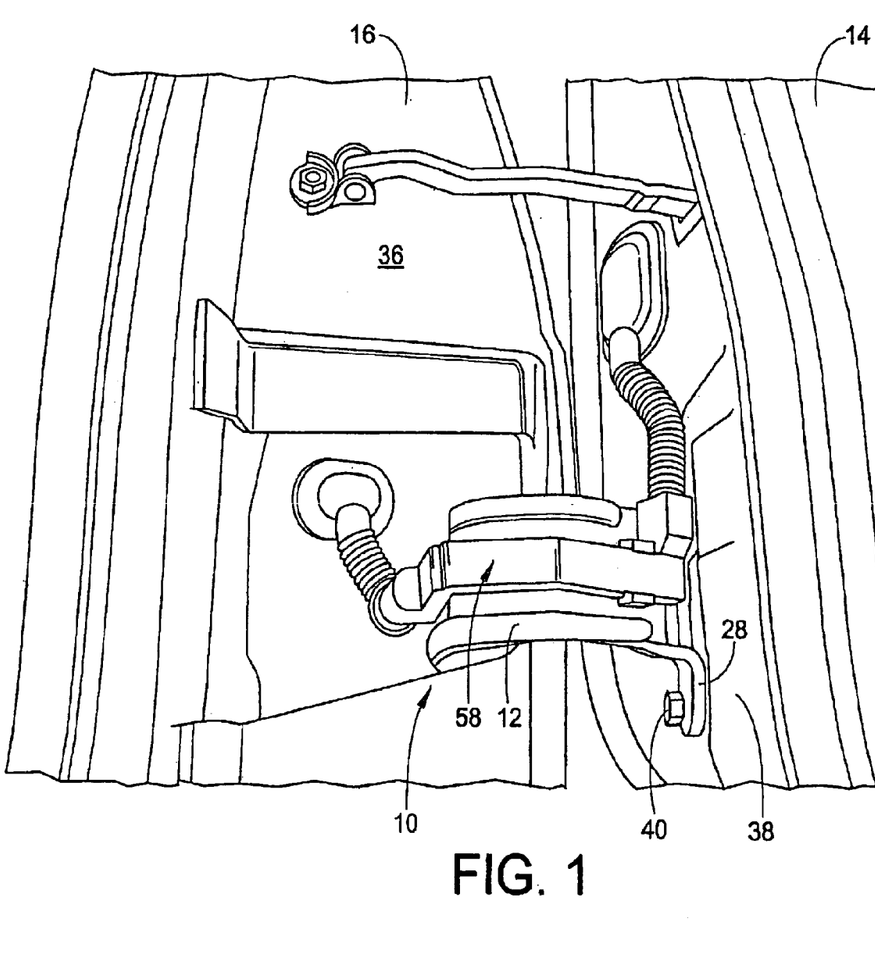
FIG. 1 is a perspective view of a vehicle door wire harness arrangement according to a preferred embodiment of the present invention showing a wire harness extending between a vehicle main body and a vehicle door component for carrying one or more wires therebetween, the wire harness is mounted to a hinge member connecting the vehicle door component to the vehicle main body.

Referring now to the drawings wherein the showings are for purposes of illustrating the preferred embodiments of the invention only and not for purposes of limiting the same, FIG. 1 shows a vehicle door hinge wire arrangement generally designated by reference numeral 10. The arrangement 10 includes a hinge member 12 connecting a vehicle component 14 to a vehicle main body 16. In the illustrated embodiment, the vehicle component 14 is a vehicle door hingedly connected to the vehicle main body 16 by the hinge member 12. However, it is to be appreciated that in alternate embodiments the vehicle component 14 may be a trunk lid, hood, fuel cap cover, or any other vehicle component connected to the vehicle main body 16.

The vehicle door hinge wire arrangement 10 further includes a wire harness 18 mounted to the hinge member 12. In the embodiment shown, the wire harness 18 is connected to the hinge member 12 with fasteners or connectors as will be described in more detail below. Alternatively, the wire harness may simply be placed in close relationship to or captured by the hinge member 12. The wire harness 18 carries a wire grouping or wire connection 20 (FIG. 3) that extends between the vehicle main body 16 and the vehicle door 14. The wire grouping or connection 20 includes one or more wires that may be bunched together for carrying electrical signals and/or power between the vehicle door 14 and the vehicle main body 16. The wire grouping 20 may itself be referred to as a wire harness that is distinct from the wire harness 18. In a typical vehicle application, the wire grouping 20 includes a plurality of wires that communicate with and/or power various components and switches located on the vehicle door 14. For example, the plurality of wires may power and communicate with the side view mirrors, side view mirror control switches, side view mirror defrosters and their control switches, windows and their control switches, interior and exterior lights carried on the door 14 and their control switches, as well as any other component or switch carried on the door 14.

Figure 3:
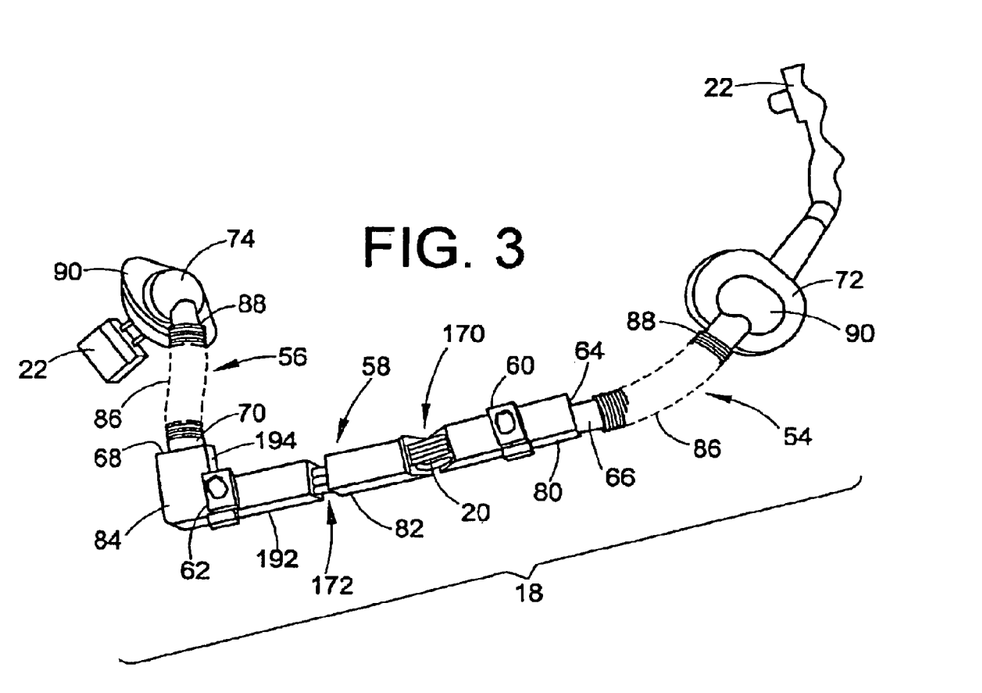
FIG. 3 is a perspective view of an underside of the wire harness of FIG. 1 showing a pair of clips slidably attached to a protector of the wire harness for mounting the wire harness to the hinge member.

While typical vehicle door applications tend to use a plurality of wires, it is contemplated that the present invention may be employed where only a single wire is used. Accordingly, it is to be appreciated that the use or description of a wire connection, wire grouping, plurality of wires or the like is also intended to cover the use of a single wire. With reference to FIG. 3, the wire grouping 20 may include adapters 22 at one or both ends for readily connecting the wire grouping 20 to associated wire groupings (not shown) in the vehicle door 14 and/or the vehicle main body 16.

Figure 2:
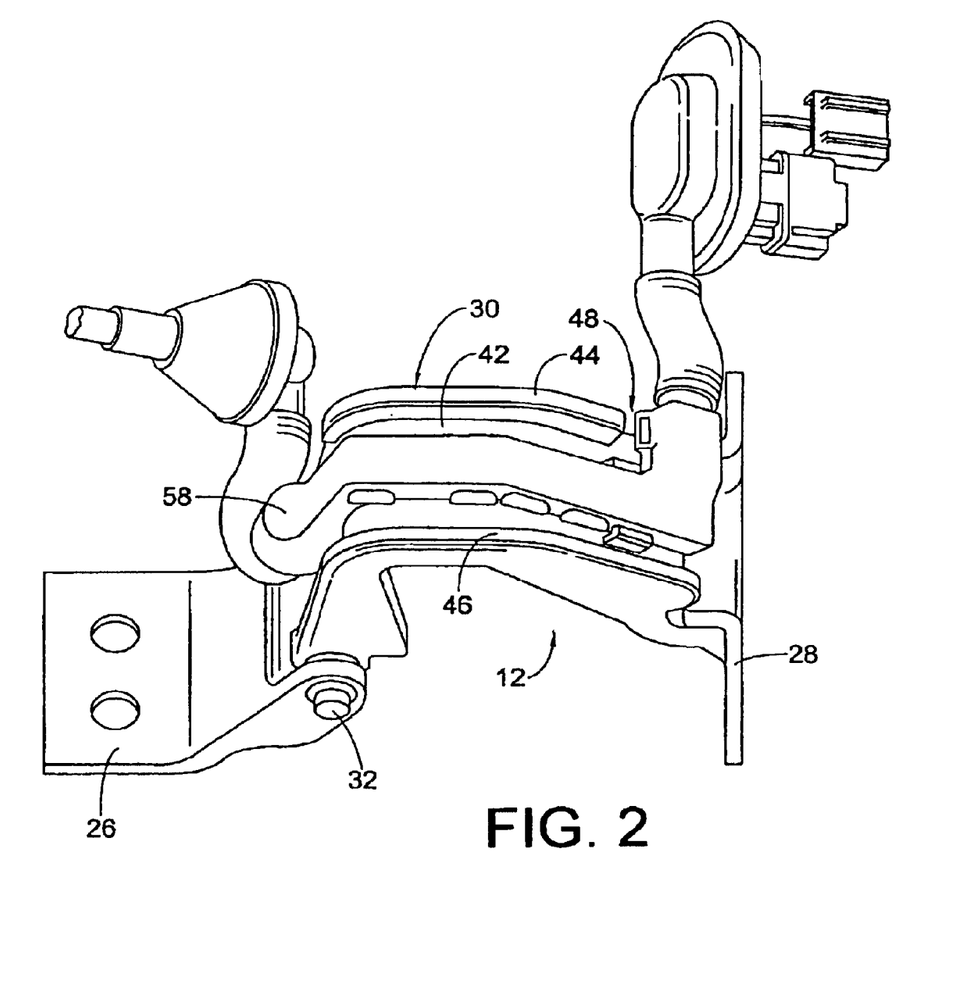
FIG. 2 is a perspective view of the vehicle harness wire arrangement of FIG. 1 wherein the vehicle door component and the vehicle main body have been removed to reveal brackets of the hinge member.

With reference to FIG. 2, the hinge member 12 includes a first bracket 26 for mounting to the main vehicle body 16 and a second bracket 28 for mounting to the vehicle door 14. Further, the hinge member 12 includes a body 30 integrally formed with the second bracket 28 and hingedly connected by hinge pin 32 to the first bracket 26. With additional reference to FIG. 1, the first bracket 26 is mounted to a lateral face 36 of the vehicle body 16 and the second bracket 28 is mounted to a lateral face 38 of the vehicle door 14 by bolts 40.

With reference to FIG. 2, the hinge member body 30 is generally C-shaped and includes a curved vertical face 42 flanked by an upper wall 44 and a lower wall 46. The vertical face 42 and the walls 44,46 form a channel adapted to receive a portion of the wire harness 18. More particularly, the walls 44,46 extend outward relative to the vertical face 42. The upper wall 44 is abbreviated relative to the lower wall 46 at one end of the hinge member 12 thereby defining a gap 48 that permits the wire harness 18 to exit from the channel. A portion of the wire harness 18 also referred to herein as a protector or a segmented protector 58, is positioned within the channel of the hinge member body 30 and conforms generally to the curvature of the hinge member vertical face 42 as will be described in more detail below.

With additional reference to FIG. 3, the wire harness 18 includes a first grommet 54, a second grommet 56, and a segmented protector 58. The segmented protector 58 is connected to a pair of mounting members or clips 60,62 that are used to mount the wire harness 18, and specifically the segmented protector 58, in the hinge member channel and to the vertical face 42 of the hinge member 12. The segmented protector 58 includes a first end 64 adapted to receive a first end 66 of the first grommet 54 and a second end 68 adapted to receive a first end 70 of the second grommet 56. The first grommet 54 includes a second end 72 that connects to an opening (not shown) in the lateral face 36 of the vehicle main body 16. The first grommet 54 carries the wire grouping 20 from the segmented protector first end 64 to the vehicle main body 16. The second grommet 56 includes a second end 74 that connects to an opening (not shown) in the lateral face 38 of the vehicle door 14. The second grommet 56 carries the wire grouping 20 from the segmented protector second end 68 to the vehicle door 14.

With continued reference to FIG. 3, the segmented protector 58 is formed by a plurality of segments that each carry a portion of the wire grouping 20. More specifically, the plurality of segments includes a first segment 80, a second segment 82 and a third segment 84. Each of the segments 80,82,84 is a generally rigid structure. In the embodiment shown, the segments 80,82,84 are interconnected by living hinges, as will be described in more detail below. The interconnected segments 80,82,84 allow the segmented protector 58 to conform to a desired shape such as the curved vertical face 42 of the hinge member 12 while carrying the wire grouping 20. Thus, with reference to FIGS. 1 and 2, the wire grouping 20 conforms to the shape of the segmented protector 58 and is carried adjacent the hinge member 12. In other applications, the protector 58 could conform to or form a contour of any other desired object or predetermined shaped structure and the wire grouping 20 would conform to, and be held adjacent, the object or predetermined shaped structure that the segmented protector 58 is conformed and/or mounted to.

With reference back to FIG. 3, the grommets 54,56 are generally conventional grommets providing a waterproof tube for flexibly carrying the wire grouping 20 from respective ends 64,68 of the segmented protector 58 to the vehicle main body 16 and the vehicle door 14, respectively. The first ends 66,70 of the grommets 54,56 have a cross-section appropriately sized to be securely received within respective ends 64,68 of the segmented protector 18. Each of the grommets 54,56 includes a central portion 86 having a plurality of ribs 88 thereon permitting the grommets 54,56 to be flexible and bendable. At respective second ends 72,74, each of the grommets 54,56 includes a head 90 adapted to matingly engage with and overlie the openings of the vehicle main body 16 and the vehicle door 14.

Figure 4:
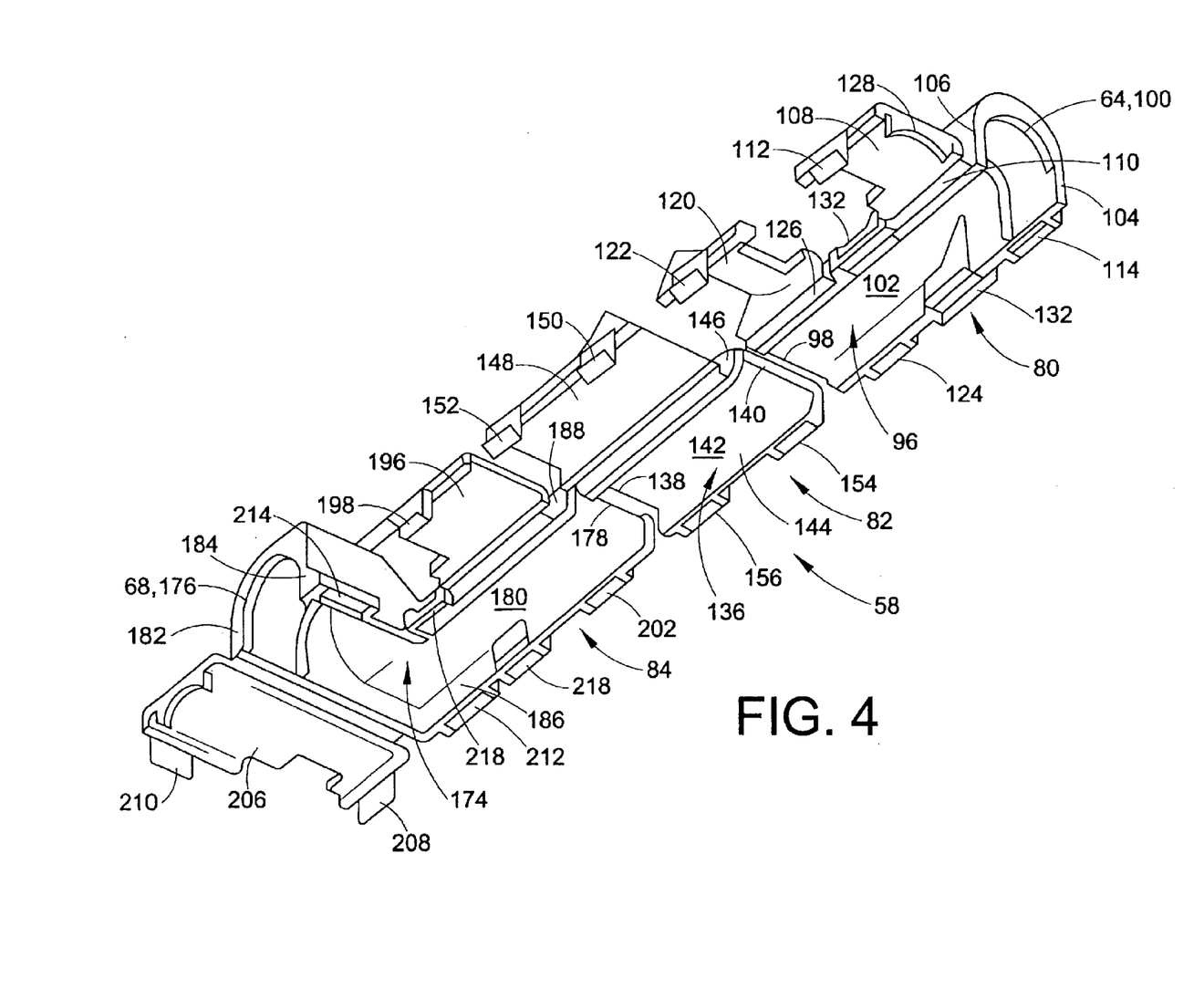
FIG. 4 is a perspective view of the protector of FIG. 3 in an unassembled state.

With reference to FIG. 4, the first segment 80 includes a body defining a hollow portion or first wire receiving area 96. The body also defines a first open end 98 and a second open end 100 spaced apart from the first open end 98. The second open end 100 is also the protector first end 64. The open ends 98,100 are in communication with the wire receiving area 96. More specifically, the wire receiving area 96 is in the form of a channel or trough having a base wall 102 and a pair of sidewalls 104,106. The channel-shaped wire receiving area 96 defines a side opening opposite the base wall 102 and between the sidewalls 104,106 and the open ends 98,100.

The first segment 80 further includes a first cover or retaining member 108 adjacent the second open end 100. The cover 108 is moveable between an open position which permits ingress and egress through the side opening along its entire longitudinal extent and a closed position that prevents ingress and egress through a portion of the side opening. Thus, when the cover 108 is in the closed position, the channel-shaped wire receiving area 96 is enclosed along the portion of the wire receiving area 96 that the cover 108 extends along.

The cover 108 is connected to the body along a distal edge of the sidewall 106. More specifically, the cover 108 is connected to the sidewall 106 by a living hinge or flexible connector 110. The cover 108 includes a fastener 112 that is removably securable or lockable to a fastener receiving opening 114. In the preferred embodiment, the locking engagement between the fastener 112 and the fastener receiving opening 114 is achieved upon application of a force greater than about 49 Newtons and disengageable upon application of a removing force greater than about 78.5 Newtons. Of course, these forces are only examples and other fastener configurations are possible that may have different force characteristics.

The first segment 80 also includes a second cover 120 adjacent the first open end 98. In most respects, the second cover 120 is similar to the first cover 108. For example, the second cover 120 includes a fastener 122 that is capable of locking engagement with a fastener receiving opening 124 on the body of the first segment 80. The second cover 120 is connected to the first segment body by a living hinge 126. One difference between the covers 108,120, however, is that the first cover 108 includes a protruding edge 128 adjacent the first segment second end 100. The protruding edge 128 is positioned at the segmented protector first end 64 for retaining the first grommet 54 therein.

Figure 5:
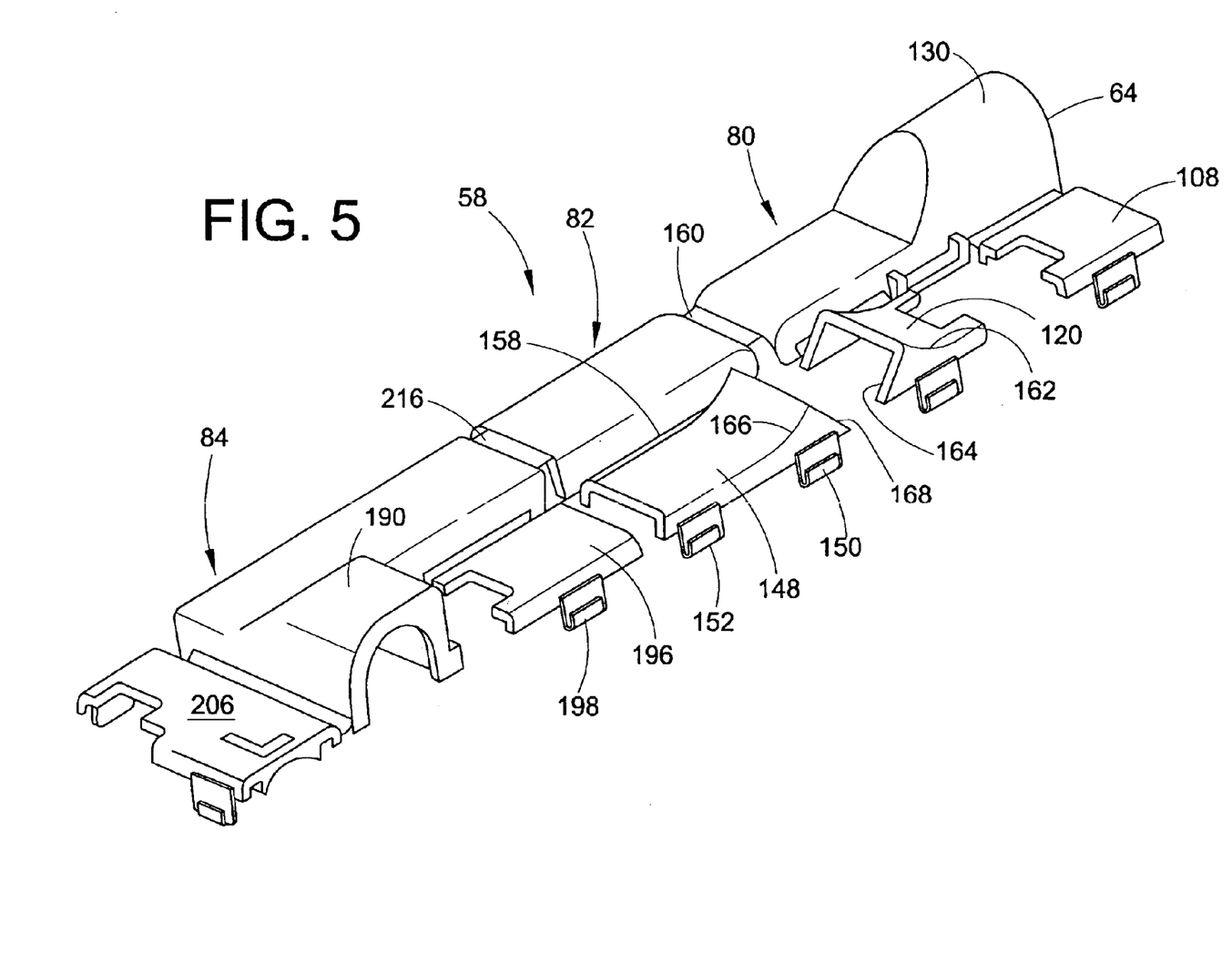
FIG. 5 is a perspective view of an underside of the protector of FIG. 4.

With additional reference to FIG. 5, the wire receiving area 96 of the first segment 80 includes an enlarged portion 130 adjacent the protector first end 64 and appropriately sized for receiving the first grommet 54. Additionally, the first segment 80 includes a pair of opposing clip mount openings 132 on the distal edges of the sidewalls 104,106 between the covers 108,120. The clip mount openings 132 are used to connect the protector 58 to the clip 60 (FIG. 3).

The second segment 82 includes a second wire receiving area 136. Similar to the first segment 80, the second segment 82 includes a body that defines the second wire receiving area 136. The body also defines a first open end 138 and a second open end 140 spaced apart from the first open end 138, both in communication with the second wire receiving area 136. The wire receiving area 136 forms a trough or channel and is defined by a base wall 142 and pair of upstanding sidewalls 144,146. Unlike the base wall 102 of the first segment 80, the base wall 142 is generally planar as it does not have enlarged portion, like the enlarged portion 130, adapted to receive a grommet.

The second segment 82 includes a single cover 148 that functions in the same way as the covers 108,120 of the first segment 80. The cover 148 includes two fasteners 150,152 located adjacent a distal edge of the cover 148 and spaced apart from one another. The fasteners 150,152 are capable of locking engagement with respective fastener receiving openings 154,156 defined by the body. The fasteners 150, 152 and the receiving openings 154,156 function in the same manner as the fasteners 112,122 and receiving openings 114,124 of the first segment 80. The cover 148 is connected to the body by a living hinge 158.

As discussed above, the first and second segments 80,82 are connected together by a flexible connector or living hinge 160 which permits flexing or bending relative to one another and allows the segmented protector 58 to bend or conform to the shape of another component, i.e., a predetermined shaped structure, and/or form a contour thereof. Specifically, the living hinge 160 is between the adjacent ends 98,140 of the first and second segments 80,82 and adjacent respective base sidewalls 102,142.

With specific reference to FIG. 5, the second cover 120 of the first segment 80 includes a flared portion 162 that intersects with a sloped portion 164. The sloped portion 164 is adjacent the first open end 98. Like the second cover 120, the cover 148 of the second segment 82 includes a flared portion 166 and a sloped portion 168. The sloped portion 168 is adjacent the second open end 140 of the second segment 82. With reference to FIG. 3, when the covers 120 and 148 are in their respective closed positions, the flared and slope portions 162–168 of the covers 120,148 form and define a gap 170 opposite the living hinge 160. The gap 170 permits a greater degree of flexing by the living hinge 160 when the channel-shaped wire receiving areas 96,136 are approaching one another during bending of the segmented protector 58. A second gap 172 is disposed opposite the living hinge 216.

With reference to FIG. 4, the third segment 84 includes a third wire receiving area 174. As shown, the third wire receiving area 174 is generally L-shaped. Similar to the previously described segments 80,82, the third segment 84 includes a body that defines the third wire receiving area 174. Additionally, the body defines a first open end 176 that is the same as the segmented protector second end 68 and a second open end 178 spaced apart and approximately normal to the first open end 176. Again, the wire receiving area 174 forms a trough or channel capable of carrying the wire grouping 20. The channel-shaped wire receiving area 174 is defined by a base wall 180 and a plurality of sidewalls 182,184,186,188. Adjacent the first open end 176, the wire receiving area 174 and, particularly, the base wall 180 include an enlarged portion 190 (FIG. 5) adapted to receive the second grommet 56.

With reference to FIG. 3, due to the L-shaped body, the third segment 84 forms a first leg portion 192 adjacent the second segment 82 and a second leg portion 194 that includes the second protector end 68. With additional reference to FIGS. 4 and 5, the third segment 84 includes a first cover 196 on the first leg portion 192 having a fastener 198 receivable in a fastener receiving opening 202 defined in the third segment body. The third segment 84 also includes a second cover 206 on the second leg portion 194 having fasteners 208,210 receivable in fastener receiving openings 212,214. The covers 196,206 and their fasteners and corresponding receiving openings function in the same manner as the aforementioned covers, fasteners, and fastener receiving openings.

The third segment 84 is connected to the second segment 82 by another living hinge 216. The living hinge 216 functions like the hinge 160 between the first and second segments 80,82 permitting flexing and bending of the protector 58. The third segment 84 additionally includes a pair of opposing clip mount openings 218 on the distal edges of the sidewalls 186,188 on the first leg portion 192 adjacent the second leg portion 194. The lengths of the clip mount openings 218 are abbreviated relative to the lengths of the clip mount openings 132.

Figure 6:
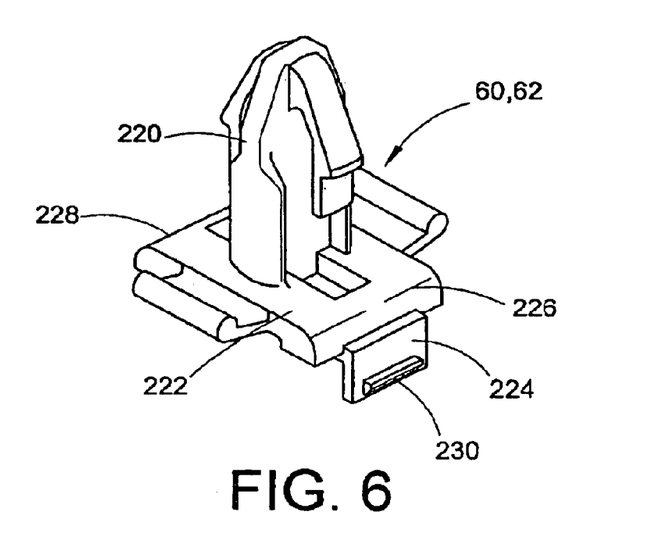
FIG. 6 is a perspective view of one of the pair of clips of FIG. 3.

With reference to FIG. 6, one of the clips 60,62 of FIG. 3 is shown in detail. The clips 60,62 each include a protruding portion 220 for mounting into a rectangular or circular opening such as the openings (not shown) provided on the hinge member 12. Additionally, the clips 60,62 each include a head portion 222. The head portions 222 are each a generally constant and predetermined thickness such as about 2 mm. The head portions 222 include protruding tabs 224 (only one shown) located on opposing edges 226,228 thereof. The tabs 224 each include a protrusion 230 for locking engagement in a corresponding clip mount opening. The tabs 224 of each of the clips 60,62 are received within respective clip mount openings 132 or 218 of either the first or third segments 80,84.

The clip mount openings 132 are longer in length than the lengths of the tabs 224 permitting the clip 60 connected to the first segment 80 to slide within the clip mount openings 132 in a direction parallel with a longitudinal extent of the first segment 80. The slidable relationship between the first segment 80 and the hinge member 12 provides ample slack in the mounting arrangement permitting the hinge member 12 to operate without detrimentally affecting the wire harness arrangement 10. In the embodiment herein described, two clips 60,62 are used to mount each of the first and third segments 80,84 to the hinge member 12 and the first clip 60 slides relative to the first segment 80. Of course other mounting and connecting variations are contemplated and are to be considered within the scope of the present invention.

Figure 7:
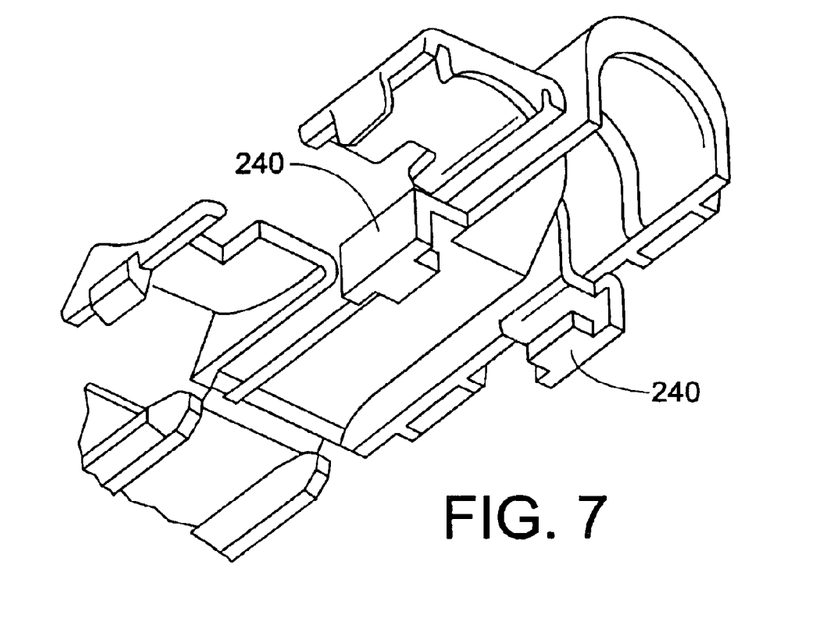
FIG. 7 is a partial perspective view of a protector in accordance with an alternate embodiment of the present invention.
Figure 8:
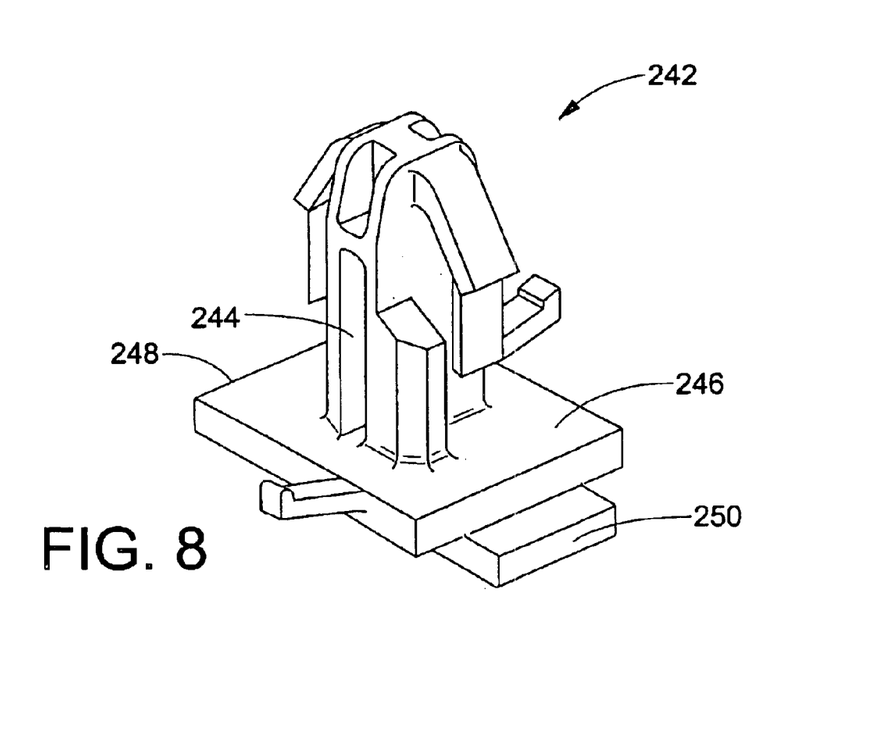
FIG. 8 is a perspective view of a clip in accordance with an alternate embodiment of the present invention.

For example, with reference to FIG. 7, the segmented protector could be modified to include a pair of opposing clip mount brackets 240. With additional reference to FIG. 8, a modified clip 242 could be used to slidably connect the segmented protector having brackets 240 to the hinge member 12. The modified clip 242 includes a protruding portion 244 for mounting into a rectangular or circular opening such as the openings (not shown) provided on the hinge member 12. The modified clip 242 includes a head portion 246. A first edge 248 and a second, protruding edge 250 of the head portion 246 are slidably received within the brackets 240. The modified clips 242 and brackets 240 could be used to provide additional slack in the mounting of the segmented protector to the hinge member 12.

To assemble, the wire grouping 20 is threaded through each of the first and second grommets 54,56. The grommets 54,56 are spread apart to provide a central portion of the wire grouping 20 for placement in the segmented protector 58. The central portion of the wire grouping is then positioned within the wire receiving areas 96,136,174 of the segments 80,82,84. The covers 108,120,148,196,206 are then moved to their respective closed and locked positions securing the wire grouping 20 within the segmented protector 58. Using the clips 60,62, the protector 58 can be slidably mounted to the hinge member 12 of a vehicle. Lastly, the appropriate connections to the associated wire groupings in the vehicle door 14 and the vehicle main body 16 can be made using the adapters 22 and the grommets 54,56 are installed on the body 16 and door 14, respectively.

Once installed, the wire harness arrangement 10 conforms to the shape of the hinge member 12. More particularly, the segmented protector 58 conforms to and forms a contour around the vertical face 42 of the hinge member 12. The vehicle door 14 is capable of moving to a fully open position up to around one hundred and eighty degrees relative to the vehicle body 16 while the wire harness arrangement 10 supports and protects the wire grouping.

The invention has been described with reference to the preferred embodiments. Obviously, modifications and alterations will occur to others upon reading and understanding the preceding detailed description. It is intended that the invention be construed as including all such modifications and alterations insofar as they are within the scope of the appended claims as the equivalents thereof.

Having thus described the preferred embodiments, the invention is now claimed to be:

1. A vehicle door wire harness arrangement extending between a vehicle main body and a vehicle door along a door hinge, comprising:

a hinge between a vehicle main body and a vehicle door; and a protector bending to conform to the shape of the hinge for carrying at least one wire along the hinge, the at least one wire extending between the vehicle main body and the vehicle door, the protector being a plurality of rigid segments permitting the protector to bend to conform to the shape of the hinge and carrying the at least one wire closely adjacent a vertical face of the hinge.

2. The vehicle door wire harness arrangement of claim 1 further including:

a flexible grommet for carrying the at least one wire, the flexible grommet extending between one end of the protector and one of the vehicle main body and the vehicle door and the plurality of rigid segments positioned along an axial length of the at least one wire.

3. The vehicle door wire harness arrangement of claim 1 wherein the protector includes a first end and a second end, the first end connected to a first grommet for carrying the at least one wire between the protector first end and an opening in the vehicle main body, and the second end connected to a second grommet for carrying the at least one wire between the protector second end and an opening in the vehicle door.

4. The vehicle door wire harness arrangement of claim 1 further comprising:

a flexible grommet for carrying the at least one wire, the flexible grommet extending between one end of the protector and one of the vehicle main body and the vehicle door.

5. The vehicle door wire harness arrangement of claim 1 further comprising clips that slidably connect the protector to the vertical face of the hinge.

6. A protector comprising:

a first segment including a body defining a first wire receiving area and a cover connected to the body by a living hinge, the body including:
    a first open end in communication with the first wire receiving area,
    a second open end spaced apart from the first open end and in communication with the first wire receiving area, and
    a side opening extending the distance between the first and second open ends and in communication with the first wire receiving area,
    wherein the cover is movable between an open position permitting ingress and egress through the side opening and a closed position preventing said ingress and egress; and a second segment including a second wire receiving area, the second segment attached to the first segment by a flexible connector.

7. The protector of claim 6 wherein the first segment includes a fastener for locking the cover in the closed position.

8. A wire harness for carrying at least one wire therein between first and second vehicle components wherein the first vehicle component is adapted to move relative to the second vehicle component, the wire harness comprising:

a flexible grommet having (1) a first end connected to one of the first and second vehicle components and (2) a second end, the grommet carving at least one wire therein from the first end to the second end; and a protector attached to an associated hinge member connecting first and second vehicle components, the protector having (1) a protector first end connected to the second end of the grommet and (2) a protector second end, the protector carrying the at least one wire from the second end of the grommet to the second end of the protector and against a vertical face of the associated hinge member, the at least one wire connecting from the protector second end to the other one of the first and second vehicle components, said protector segmented into at least two interconnected sections allowing the protector to bend to conform to the shape of the hinge.

9. The wire harness of claim 8 wherein the first vehicle component is a vehicle door and the second vehicle component is the vehicle body.

10. A wire harness for carrying at least one wire therein between first and second vehicle components wherein the first vehicle component is adapted to move relative to the second vehicle component, the wire harness comprising:

a flexible grommet having a first end connected to one of the first and second vehicle components and a second end, the grommet adapted to carry at least one wire therein from the first end to the second end;

a protector having a first end connected to the second end of grommet and a second end, the protector adapted to carry the at least one wire therein from the second end of the grommet to the second end of the protector; and a second flexible grommet having a first end connected to the second end of the protector and a second end connected to the other one of the first and second vehicle components, the second grommet adapted to carry the at least one wire therein from the second end of the protector to said other one of the first and second vehicle components.

11. The wire harness of claim 10 wherein the protector is segmented into at least two interconnected sections allowing the protector to form a contour.

12. The wire harness of claim 11 wherein the protector is attached to an associated hinge member and the contour is that of the associated hinge member.

13. The wire harness of claim 10 wherein the protector comprises:

a first segment; and a second segment connected to the first segment by a living hinge connection permitting the first and second segments to bend relative to one another.

14. The wire harness of claim 13 wherein the first and second segments include hollow portions for receiving the at least one wire and the living hinge is between adjacent ends and sides of the first and second segments.

15. The harness of claim 14 wherein sides of the first and second segments opposite the sides adjacent the living hinge include gaps to permit bending of the protector.

16. A protector for carrying at least one wire of a vehicle comprising:

a first segment including a first wire receiving area; and a second segment including a second wire receiving area, the second segment attached to the first segment by a flexible connector;

wherein the first and second segments follow the contour of an associated hinge and connect to the hinge to carry an associated at least one wire thereagainst.

17. The protector of claim 16 wherein the flexible connector permits the protector to generally conform to a predetermined shaped structure.

18. The protector of claim 17 wherein the predetermined shaped structure is a door hinge member.

19. The protector of claim 16 wherein the first wire receiving area is a channel adapted to receive an associated wire harness therein.

20. The protector of claim 19 wherein the first segment includes a cover for laterally enclosing the channel along at least a portion of a longitudinal extent of the channel.

21. The protector of claim 16 wherein the first segment includes a retaining member for preventing egress from the first wire receiving area.

22. The protector of claim 16 wherein the first segment includes a body defining the first wire receiving area and a cover connected to the body by a living hinge.

23. The protector of claim 16 further comprising:
a third segment including a third wire receiving area, the third segment attached to the second segment by a second flexible connector.

24. The protector of claim 16 wherein the first segment includes connectors for attaching the protector to an associated mounting member.

* * * * *

UNITED STATES PATENT AND TRADEMARK OFFICE
CERTIFICATE OF CORRECTION

PATENT NO. : 6,844,497 B2
DATED : January 18, 2005
INVENTOR(S) : Matthew Frantz et al.

It is certified that error appears in the above-identified patent and that said Letters Patent is hereby corrected as shown below:

Column 9,
Line 63, replace "carving" with -- carrying --.

Signed and Sealed this

Twelfth Day of April, 2005

JON W. DUDAS
*Director of the United States Patent and Trademark Office*